United States Patent [19]
Emmons

[11] Patent Number: 5,703,598
[45] Date of Patent: Dec. 30, 1997

[54] METHOD AND SYSTEM FOR TRACKING STOLEN PROPERTY

[76] Inventor: Ardath H. Emmons, 13217 W. Marble Dr., Sun City West, Ariz. 85375

[21] Appl. No.: 653,488

[22] Filed: May 24, 1996

[51] Int. Cl.$^6$ .................................................. G01S 5/02
[52] U.S. Cl. ............................................ 342/357; 342/457
[58] Field of Search .................................. 342/352, 357, 342/457

[56] References Cited

U.S. PATENT DOCUMENTS

| | | |
|---|---|---|
| 4,177,466 | 12/1979 | Reagan . |
| 4,651,156 | 3/1987 | Martinez . |
| 4,672,655 | 6/1987 | Koch . |
| 4,672,656 | 6/1987 | Pfeiffer . |
| 4,742,357 | 5/1988 | Rackley . |
| 4,835,537 | 5/1989 | Manion . |
| 4,884,208 | 11/1989 | Marinelli . |
| 4,918,425 | 4/1990 | Greenberg . |
| 5,043,736 | 8/1991 | Darnell . |
| 5,115,223 | 5/1992 | Moody . |
| 5,193,215 | 3/1993 | Olmer . |
| 5,223,844 | 6/1993 | Mansell . |
| 5,396,430 | 3/1995 | Arakawa . |
| 5,450,329 | 9/1995 | Tanner . |
| 5,475,597 | 12/1995 | Buck . |
| 5,490,200 | 2/1996 | Snyder . |
| 5,493,294 | 2/1996 | Morita . |

*Primary Examiner*—Thomas H. Tarcza
*Assistant Examiner*—Dao L. Phan
*Attorney, Agent, or Firm*—Patnaude, Videbeck & Marsh

[57] ABSTRACT

A method of tracking stolen property uses a continuously powered radio receiver for receiving encoded signals from a central station. When the received signal corresponds to a unique code stored at the receiver, a GPS receiver and a radio transmitter located with the stolen property are connected for a predetermined period of time to a source of power so that a GPS signal received by the receiver is processed and the position data produced thereby is transmitted to the central station.

5 Claims, 1 Drawing Sheet

METHOD AND SYSTEM FOR TRACKING STOLEN PROPERTY

The present invention relates in general to methods and apparatus making use of the signals from the Global Positioning System (GPS) satellites to indicate the location of a GPS receiver, and it relates more particularly to a new and improved method and system for tracking the location of a stolen vehicle or other property in which a GPS receiver is disposed.

BACKGROUND OF THE INVENTION

In the United States alone, millions of dollars worth of automobiles, motorcycles, boats, and airplanes are stolen each year, and it would be desirable to provide a way to promptly locate the stolen property after it has been stolen and moved and before it can be dismantled or moved beyond the reach of the owner or other authorities.

In U.S. Pat. No. 4,177,466 - Reagan there is disclosed a system for locating stolen property such as automobiles using a triangulation method of direction finding in which three mobile transmitter/receivers are adapted to receive a non-directional signal from a transmitter located in the stolen vehicle. The transmitter in the stolen vehicle must first be awakened by an encoded signal from a central station before transmitting the non-directional signal, which is then continuously transmitted for an indefinite period of time, presumably until the vehicle is recovered or the power source to the transmitter is exhausted.

Since the Global Positioning System has been put into operation, many devices have been patented and marketed which make use of a GPS receiver to identify the position of a device in which the GPS receiver is disposed. Such devices are used, for example, by fisherman to find precise geographical positions on bodies of water, by trucking companies to track the location of their over-the-highway trucks, and automobile drivers to identify their own instantaneous geographical position. However, none of these systems are of use in locating a stolen piece of property unless the thief is willing to and actually does actuate the proper device in the vehicle to activate the receiver and transmitter located in the stolen piece of property.

SUMMARY OF THE INVENTION

Briefly there is provided in accordance with the present invention a novel method and apparatus for promptly locating a stolen vehicle or other property without the aid of anyone in the vehicle and, indeed, in spite of whatever such a person might do to defeat the system. Unlike the tracking and position finding systems and methods known in the prior art, the present invention provides for a continuous standby power system which maintains a radio receiver functional at all times. Upon receipt of a properly coded signal, unique to the receiver in question, a GPS receiver/transmitter is enabled and immediately begins to transmit a signal encoded with the precise geographical position (longitude and latitude) of the GPS receiver/transmitter. After a predetermined period, of say, five minutes, the GPS receiver/transmitter is disabled by a timer, but may be enabled by a subsequent signal from the central station to transmit the signal encoded with the position of the GPS receiver/transmitter for an additional predetermined period of time.

The standby receiver and the GPS receiver/transmitter are physically mounted at a place on the vehicle or the like which is difficult to reach and from which it is almost impossible to be removed from the vehicle or to be disabled by a thief in a reasonably short period of time. For example, the electronic equipment, which is very small in physical size, may be mounted in a steel enclosure welded directly to the frame or engine block of the vehicle and connected to one or more antenna by a cable enclosed in a strong and massive conduit.

In the case of a vehicle, when the vehicle is first acquired, the owner provides a central station, such as a police department, with the unique identification code of the vehicle. For example, the identification code may be the vehicle identification number affixed to the vehicle by the manufacturer. This number is generally referred as the VIN number. However, other identification codes may be used without departing from the invention. The standby receiver in the vehicle is set to respond to a signal encoded with this unique code and not to respond to any other identification code.

When the owner of the vehicle realizes that the vehicle has been stolen, he or she reports the theft to the central station which then transmits a signal encoded with the unique identification code of the vehicle in question. Upon receipt of this signal by the standby receiver in the vehicle, its GPS receiver and transmitter are activated and the transmitter immediately commences to transmit to the central the GPS signals being received by the GPS receiver. The equipment at the central station then processes these GPS signals to determine the precise and substantially instantaneous position of the vehicle and transmits this information to a patrol vehicle and/or patrol vehicles located in the vicinity of the stolen vehicle. These patrol vehicles will receive this signal on their receivers and will be able to quickly find the vehicle. The GPS processing equipment is commercially available at a reasonable cost including CD-ROM maps etc.

DESCRIPTION OF THE DRAWING

A better and more complete understanding of the present invention may be had from a reading of the following detailed description taken in connection with the accompanying drawing wherein:

The single figure is a diagrammatic illustration of a tracking system embodying the present invention.

DETAILED DESCRIPTION OF THE INVENTION

Figure 1:
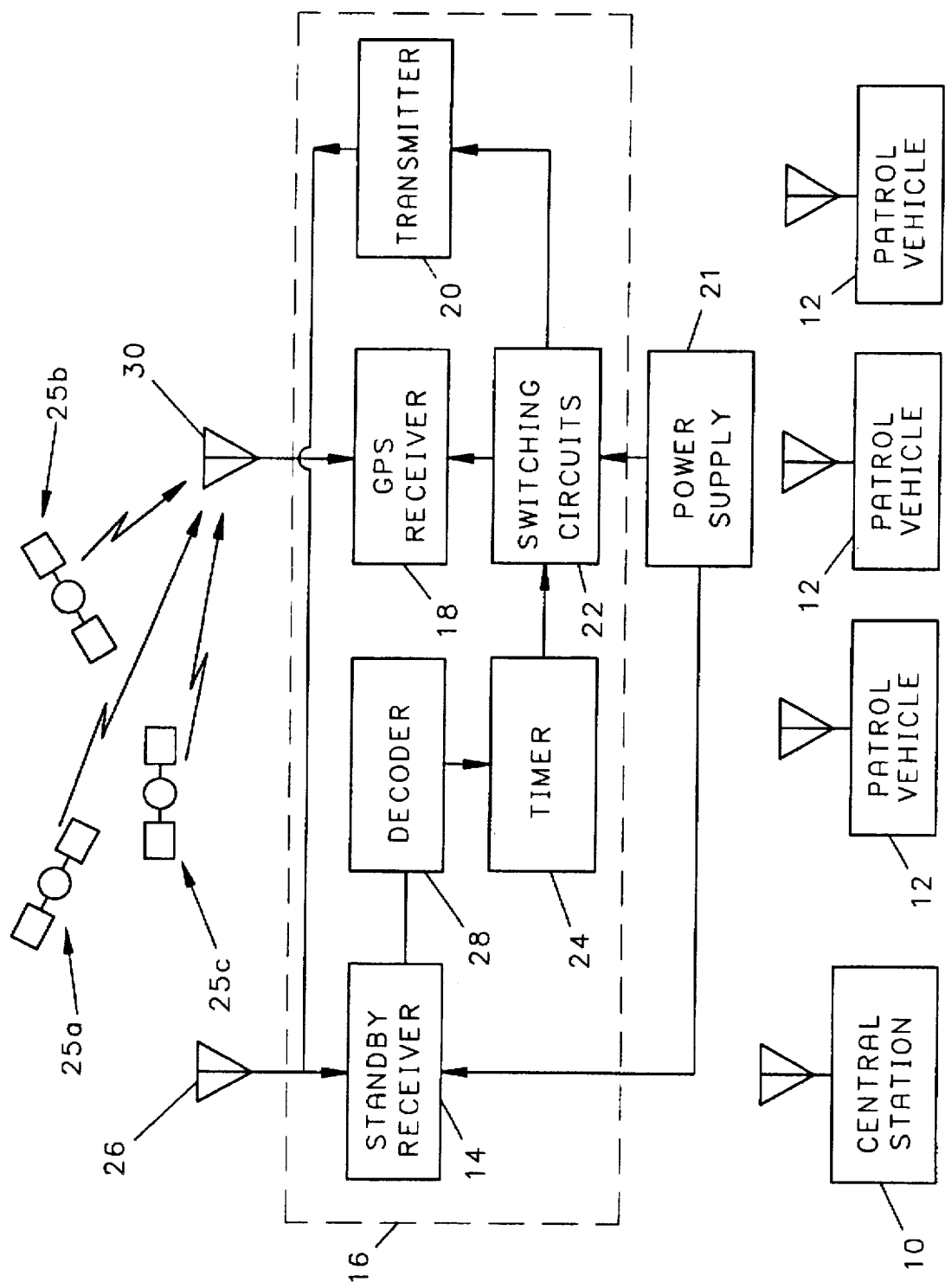

Referring now to the drawing and more particularly to FIG. 1 thereof, wherein the tracking system of the present invention may be seen to comprise a central station 10, one or more patrol vehicles 12 connected to the central station via radio, a standby radio receiver 14 mounted in a housing 16 located at the property to be tracked, a GPS receiver 18, and a GPS transmitter 20. The GPS receiver 18 and the GPS transmitter 20, like the standby receiver 14, are mounted in the housing 16 located with the piece of property to be tracked. The standby receiver 14 is directly connected to a power supply 21, such, for example, as the battery of the vehicle, and is thus energized at all times. The GPS receiver 18 and the GPS transmitter 20 are connected to the power supply 21 by switching circuit means 22 and are energized only when the switching circuits 22 are enabled by a signal from a timer 24. The enable signal from the timer 24 is initiated when a properly coded radio signal transmitted from the central station 10 is received by the standby receiver 14 via an antenna 26. The signal received by the standby receiver 14 is applied to a decoder 28 and if the received code matches the code stored in the decoder 28, an output from the decoder enables the timer 24 which enables the switching circuits to connect the power supply 21 to the GPS receiver and to the GPS transmitter. After a predetermined time of about five minutes has elapsed the enable signal from the timer 24 to the switching circuits 22 terminates and the power to the GPS receiver 18 and the GPS transmitter is interrupted.

When the GPS receiver 18 and the GPS transmitter 20 are enabled, radio signals from a plurality of GPS satellites 25a, 25b, and 25c revolving in their respective orbits around the earth are intercepted by a GPS antenna 30 and applied to the input of the GPS receiver 18. The GPS receiver processes the signals from the satellites and output position data corresponding to the geographical location of the GPS receiver. The geographical position data is applied to the transmitter 20 from which it is relayed to the central station 10 by means of radio waves developed in the transmitter 20 and transmitted from the antenna 26 or from another suitable antenna to the central station 10.

This GPS signal when received at the central station 10 is processed in the conventional manner using commercially available equipment to provide the necessary geographical coordinates to identify the precise location of the GPS antenna 28. These geographical coordinates along with the identification characteristics of the vehicle are then transmitted from the central station 10 to one or more of the patrol vehicles 12 located in the vicinity of the stolen vehicle.

While the present invention has been described in connection with a particular embodiment thereof, it will be understood that many changes and modifications may be made without departing from the true spirit and scope of the invention. Therefore, it is intended by the appended claims to cover all such changes and modifications which fall within the true spirit and scope of the invention.

What is claimed:

1. A method of locating a stolen piece of property using signals transmitted from a global position satellite system orbiting the earth, comprising the steps of mounting a first radio receiver with said property, continuously connecting said first radio receiver to a source of electric power, mounting a second radio receiver with said property, said second radio receiver being adapted to receive said signals from said global position satellite system and to process said signals to provide data corresponding to the geographical position of said second receiver, transmitting from a location remote from said property a radio signal including a unique code associated with said piece of property and said first radio receiver, when a radio signal is received by said first radio receiver which corresponds to said unique code, connecting said second radio receiver to a source of electric power for only a predetermined time period to permit said second radio receiver to receive said signals from said global position satellite system during said predetermined time period and to process said signals to provide geographical position data, and transmitting said geographical position data derived from said signals from said global position satellite system to a central station.

2. A method according to claim 1 comprising the further step of encoding said geographical position signal transmitted to said central station with said unique code to identify the source of the signal transmitted to said central station.

3. A system for tracking a piece of stolen property utilizing signals transmitted from a global position satellite system, comprising in combination a first standby radio receiver mounted with said property, means for continuously energizing said standby radio receiver, decoder means mounted with said property and connected to said standby receiver for comparing a coded signal received by said standby receiver with a unique identification code stored in said decoder means and for providing an output signal when said coded signal matches said identification code stored in said decoder means, a second radio receiver for receiving said signals from said global position satellite system, radio transmitter means responsive to an output from said second radio receiver for transmitting said data corresponding to the geographical position of said second radio receiver, a source of electric power, and switching means enabled when a coded signal received by said standby radio receiver matches said identification code stored in said decoder means for connecting said second radio receiver and said radio transmitter to said source of electric power and for disconnecting said second radio receiver from said source of electric power a predetermined time after said second radio receiver was connected to said source of power.

4. The invention set forth in claim 3, comprising central station means for transmitting said coded signal received by said standby receiver and for receiving and processing said signal transmitted by said transmitter to provide geographical data identifying the location of said property.

5. The invention set forth in claim 4, comprising one or more patrol vehicles, and means at said central station means for transmitting said geographical data to said one or more patrol vehicles.

* * * * *